UNITED STATES PATENT OFFICE.

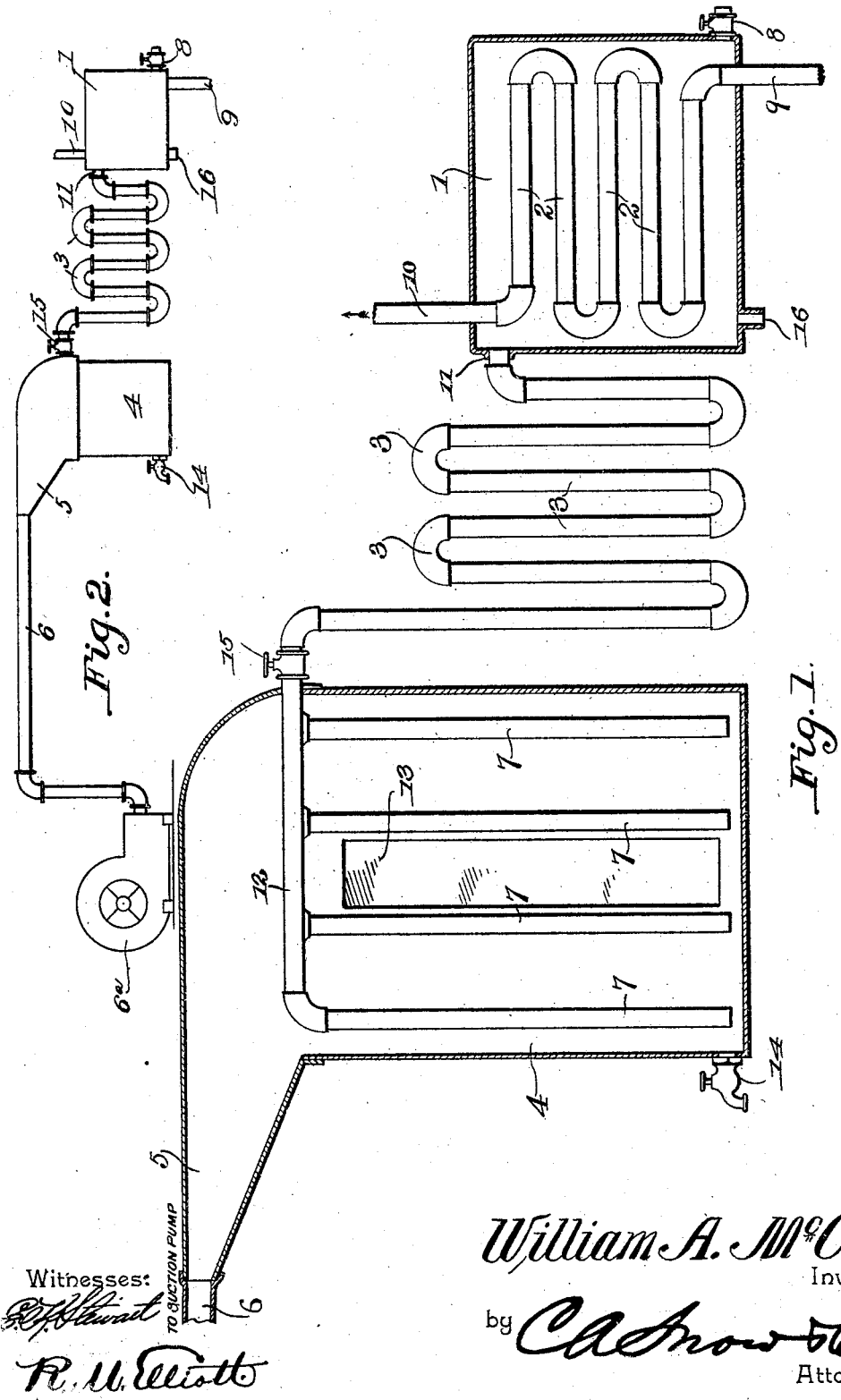

WILLIAM ARTHUR McCOOL, OF TRAVERSE CITY, MICHIGAN.

APPARATUS FOR EVAPORATING MILK.

No. 795,847.        Specification of Letters Patent.        Patented Aug. 1, 1905.

Application filed August 30, 1904. Serial No. 222,771.

*To all whom it may concern:*

Be it known that I, WILLIAM ARTHUR Mc-COOL, a citizen of the United States, residing at Traverse City, in the county of Grand Traverse and State of Michigan, have invented a new and useful Apparatus for Evaporating Milk, of which the following is a specification.

This invention relates to an apparatus for evaporating milk.

The object of the invention is in a ready, simple, rapid, comparatively inexpensive, and practical manner to evaporate milk without congealing the albumen.

The invention consists in an apparatus for evaporating milk without congealing the albumen, embodying in a connected system a heating-chamber, an evaporating-chamber, and a vacuum-dome, means for creating a vacuum or partial vacuum in the evaporating-chamber, and means for supplying heated sterilized air at the bottom of the evaporating-chamber.

The invention consists, further, in the various novel details of construction of an apparatus for evaporating milk, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in sectional elevation of a plant embodying the essential features of the present invention. Fig. 2 is a diagrammatic view exhibiting the suction mechanism combined with the plant.

Referring to the drawings, 1 designates a heating-chamber; 2, a series of heating-coils disposed therein; 3, a series of cooling-coils; 4, an evaporating-chamber; 5, a vacuum-dome with which connects a conduit 6, leading to a suitable suction device 6ª, and 7 a series of air-supply pipes disposed within the evaporating-chamber, preferably in a vertical position, and being connected with one of the terminal cooling-coils 3.

The heating-chamber 1 is a box-like structure and may be constructed of any suitable material, such as sheet metal, or of wood suitably lagged to prevent radiation of heat, and is provided at one end, preferably near its bottom, with a valved air-inlet 8. The heating-coils, of which there may be any number of convolutions, are arranged, preferably, in horizontal position within the heating-chamber, the terminal of the lower coil being connected by a branch pipe 9 with a suitable supply of steam and the terminal of the upper coil having connected with it a branch pipe 10, leading to a suitable point of discharge.

The cooling-coil, of which there may be any desired number of convolutions, has one of its terminal coils connected with the upper portion of the heating-chamber at 11 and its other terminal coil connected with a manifold 12, from which depend the air-discharge pipes 7.

The evaporating-chamber may be of any suitable material, preferably of enameled metal, on account of its seamless properties and the ease with which it may be cleansed, and may be supported in any suitable manner for operation. In order to be able to examine the contents of the chamber without removing the dome 5, there are windows 13 (one only being shown) set in the sides of the chamber and extending from a point near the bottom to a point near the top thereof. The milk may be supplied to the chamber by removing the dome, or the dome may have an opening for this purpose, as preferred. The chamber is provided near its bottom with a faucet 14, through which the milk is drawn when in fluid condition; but when it has been evaporated down to the consistency of paste it will be removed from the top by detaching the dome.

The volume of supply of air to the pipes 7 is controlled by a valve 15, mounted upon the pipe 12 exteriorly of the dome.

In the operation of the device milk is supplied to the evaporating-chamber, and upon a vacuum being created within the dome 5 air will be drawn in through the inlet 8 and be heated by the coils 2 up to about 212° Fahrenheit, which will effectually sterilize it, any water resulting from condensation being removed from the heating-chamber through the medium of a drip-pipe 16, communicating with its bottom. The air thence passes to the cooling-coils 3, where its temperature is lowered to about 140° Fahrenheit, and thence to the manifold and through the air-supply pipes to the bottom of the evaporating-chamber. The discharge of air will be quite forcible and being warm will operate to occlude the moisture in the milk and carry it to the surface, where it passes off as vapor to the suction device.

By the employment of warm sterilized air for evaporating milk and the manner in which it is supplied to the milk the evaporation is materially hastened and no congelation of the albumen ensues.

Heretofore cold air has been employed for this purpose; but experiments have proven that warm sterilized air effects evaporation more rapidly and effectively than by the methods commonly in vogue.

Having thus described the invention, what is claimed is—

An apparatus of the class described comprising a chamber provided with an air-inlet and a water-escape, a heating-coil arranged within the chamber, an evaporating-chamber provided with a dome communicating with a suitable suction device, a plurality of cooling-coils having one end communicating with the upper portion of the heating-chamber, a manifold arranged within the evaporating-chamber and communicating with the other end of the cooling-coils, air-discharge pipes depending from the manifold and extending to a point near the bottom of the evaporating-chamber, and means for controlling a passage of air through the discharge-pipes.

In testimony that I claim the foregoing as my own I have hereto affixed my signature in the presence of two witnesses.

WILLIAM ARTHUR McCOOL.

Witnesses:
   JUNE SHIELDS,
   AMIL F. NERLINGER.